C. WAINWRIGHT.
VALVE.
APPLICATION FILED APR. 15, 1909.
938,292.
Patented Oct. 26, 1909.
2 SHEETS—SHEET 2.
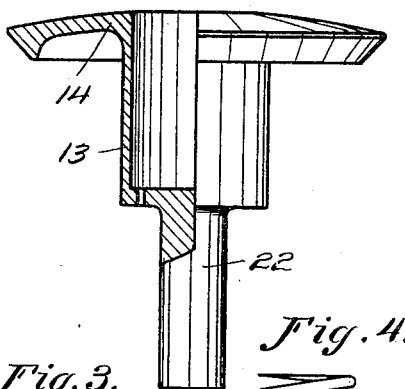
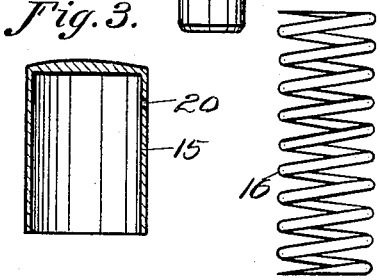
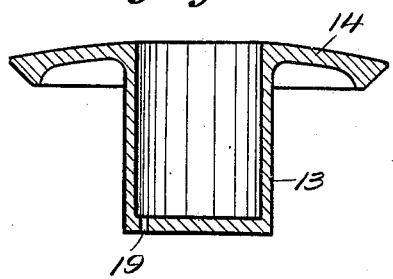
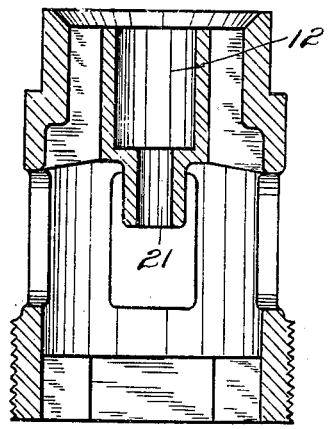
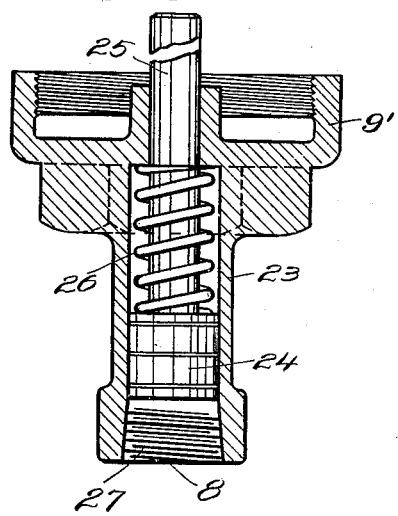

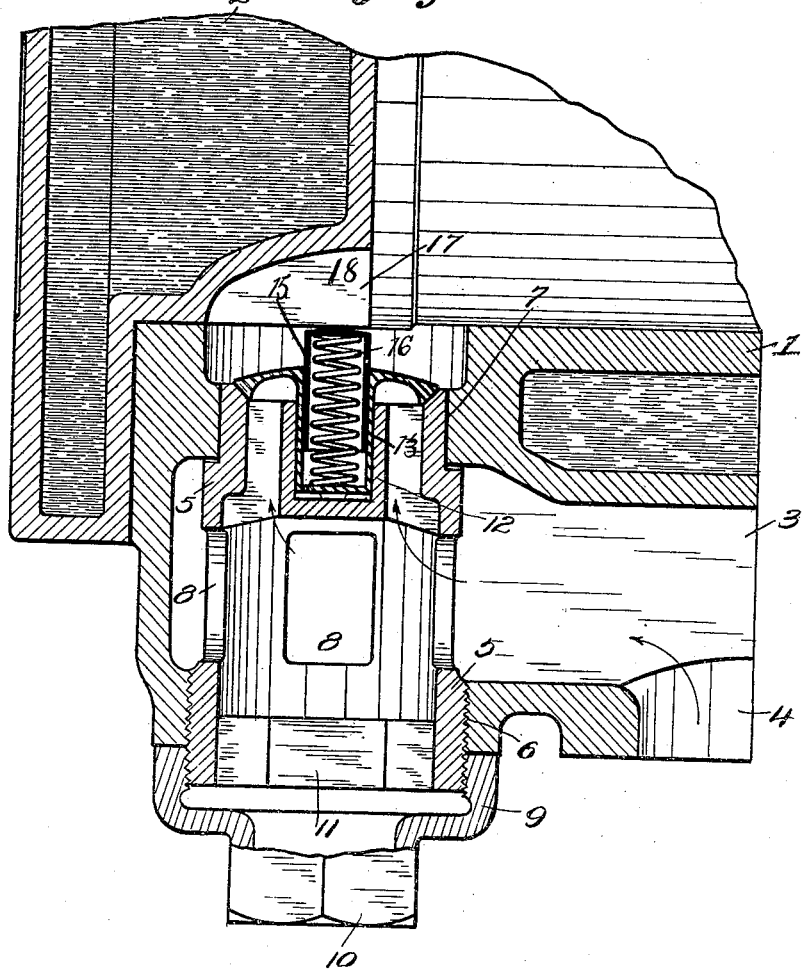

UNITED STATES PATENT OFFICE.

CHARLES WAINWRIGHT, OF ERIE, PENNSYLVANIA.

VALVE.

938,292.  Specification of Letters Patent.  Patented Oct. 26, 1909.

Application filed April 15, 1909. Serial No. 490,086.

*To all whom it may concern:*

Be it known that I, CHARLES WAINWRIGHT, citizen of the United States, residing at Erie, in the county of Erie and State of Pennsylvania, have invented new and useful Improvements in Valves, of which the following is a specification.

This invention relates to valves and while the valve hereinafter described has been especially designed for use upon air and gas compressors, vacuum pumps and the like, it will be apparent that the valve is susceptible of use in a large number of places which will readily suggest themselves.

The main object of the present invention is to provide a valve having combined therewith practical and reliable means of simple construction for preventing chattering or fluttering of the valve in the opening and closing movements thereof, the valve being cushioned in both its opening and closing movements by a quantity of trapped fluid as will hereinafter appear.

With the above and other objects in view the nature of which will fully appear as the description proceeds, the invention consists in a novel construction combination and arrangement of parts herein fully described illustrated and claimed.

In the accompanying drawings, Figure 1 is a sectional view through a portion of the cylinder of an air or gas compressor, showing the improved valve associated therewith, the valve and the parts intimately connected therewith being illustrated in diametrical sections. Fig. 2 is a diametrical section through the valve body and the cushion chamber formed thereon. Fig. 3 is a similar view of the hollow cushion piston. Fig. 4 is a side elevation of the valve spring. Fig. 5 is a diametrical section through the valve guide adapted for use in connection with an unloading valve. Fig. 6 is a similar view of a cap and piston adapted for use in connection with an unloading valve. Fig. 7 is a side elevation partly in section of an unloading valve.

Referring to drawings 1 designates the cylinder of a gas or air compressor to which the improved valve is shown connected, 2 designating the water jacket 3 the air gas or fluid chamber and 4 the inlet port leading to the chamber 3.

5 designates the valve guide which is of general cylindrical form and is threaded into the cylinder as shown at 6, the inner end portion of the guide being rabbeted and shouldered by reducing the same as shown at 7 and fitting such reduced end into a corresponding opening in the cylinder walls as clearly shown in Fig. 1. The guide 5 is provided with a circular series of inlet ports 8 allowing the fluid to pass from the chamber 3 into the interior of the guide 5. The threaded outer end portion of the guide projects outside of the cylinder and receives an internally threaded cap 9 which is provided with a nut face 10 to facilitate its application and removal. The guide 5 is also shown as provided with an internal nut face 11 for the same purpose. The valve guide 5 also embodies a central pocket 12 in which works a cylindrical cushion chamber 13 formed on or fixedly connected to the valve body 14 which is shown resting against the valve seat at the inner end of the valve guide 5. Working back and forth within the cushion chamber 13 is a hollow cushion piston 15 open at one end and closed at the other.

16 designates a valve closing spring of the expansive coil type which is housed within the piston 15 and the chamber 13, the outer closed end of said piston 15 being adapted to bear against a stop flange or web 17 which lies within the valve port 18 through which the fluid passes from the valve opening into the cylinder of the machine.

The cushion chamber 13 is provided at its inner end with a bleed hole 19 affording communication between the interior of said chamber and the pocket 12, while the cushion piston 15 is provided at a suitable point in the length thereof with a fluid trapping port 20 so located as to be closed by the valve body in the opening movement of the valve and again opened by the valve body in the closing movement of the valve. By referring to Fig. 1 it will be seen that as the valve body moves away from its seat, the port 20 is closed, thereby trapping fluid in the cushion piston and piston chamber, the fluid passing slowly through the small bleed hole 19 in the cushion chamber. In the closing movement of the valve, a cushion is thus provided between the end of the cushion chamber 13 and the bottom of the pocket 12 which causes the valve to close slowly and evenly. In other words when the valve is returning to its seat, it is opposed by a body of fluid which cushions it and prevents the valve from hammering against the seat. Thus the valve is cushioned in both directions and chattering and fluttering thereof are prevented. In order to hold the valve body unseated while the compressor is running, for the purpose of unloading the compressor, the valve guide and the valve body may be manufactured as shown in Figs. 5 and 7.

In Fig. 5 it will be noted that a guide opening 21 is provided for an extended stem 22 of the valve body as shown in Fig. 7, said stem extending from the bottom of the cushion chamber 13. In place of the cap 9 shown in Fig. 1, I may employ the cap 9' shown in Fig. 6, the said cap being provided with a hollow cylindrical extension 23 in which is arranged an unloading piston 24 having a stem 25 adapted to come in contact with the stem 22 of the valve for the purpose of holding said valve away from its seat. An expansive spring 24 arranged within the extension 23 acts on the piston 24 to hold the stem 25 normally out of engagement with the stem 22 of the valve. The extension 23 may be threaded as shown at 27 to receive an air pipe or connection whereby air may be admitted to act against the piston 24 for the purpose explained.

I claim:—

1. A valve comprising a guide provided with a valve seat, a valve body provided with a cushion chamber having a bleed hole, a cushion piston working in said chamber and having a fluid trapping port, and an expansive spring housed within said chamber and piston and acting to urge the valve toward its seat.

2. A valve comprising a guide having a valve seat and also formed with a central pocket, a valve body provided with a cushion chamber working in said pocket and having a bleed hole, a cushion piston working in said chamber and having a fluid trapping port, and an expansive spring housed within said chamber and piston and acting to urge the valve toward its seat.

3. A valve comprising a guide provided with a valve seat, a valve body provided with a cushion chamber having a bleed hole, a pocket in which said cushion chamber works, a cushion piston working in said chamber and having a fluid trapping port arranged to be opened and closed by the movement of the valve, and an expansive spring housed within said chamber and piston and acting to urge the valve toward its seat.

In testimony whereof I affix my signature in presence of two witnesses.

CHARLES WAINWRIGHT.

Witnesses:
C. A. MASTEN,
JOHN SKILLING.